(12) United States Patent
Quatrano et al.

(10) Patent No.: US 11,014,609 B2
(45) Date of Patent: May 25, 2021

(54) VEHICLE SUSPENSION

(71) Applicant: Ford Global Technologies, LLC, Dearborn, MI (US)

(72) Inventors: Nicholas Anthony Quatrano, Plymouth, MI (US); Kevin Stanton Giaier, Sylvan Lake, MI (US); Jay Bains, Belleville, MI (US); Andrew Niedert, New Hudson, MI (US); Matthew Malenfant, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 87 days.

(21) Appl. No.: 16/543,792

(22) Filed: Aug. 19, 2019

(65) Prior Publication Data
US 2021/0053622 A1 Feb. 25, 2021

(51) Int. Cl.
| | | |
|---|---|---|
| *B62D 17/00* | (2006.01) | |
| *B60G 7/00* | (2006.01) | |
| *B60G 17/005* | (2006.01) | |
| *B60G 17/015* | (2006.01) | |
| *B60G 3/06* | (2006.01) | |

(52) U.S. Cl.
CPC ............. *B62D 17/00* (2013.01); *B60G 3/06* (2013.01); *B60G 7/003* (2013.01); *B60G 7/006* (2013.01); *B60G 7/008* (2013.01); *B60G 17/005* (2013.01); *B60G 17/015* (2013.01); *B60G 2202/40* (2013.01); *B60G 2204/46* (2013.01)

(58) Field of Classification Search
CPC ........ B62D 17/00; B62D 17/006; B60G 3/26; B60G 7/003; B60G 7/006; B60G 7/008; B60G 17/015; B60G 2202/40; B60G 2204/46; B60G 2204/62; B60G 2206/46; B60G 2206/93
USPC ............................. 280/5.521, 86.751, 86.757
See application file for complete search history.

(56) References Cited

U.S. PATENT DOCUMENTS

| | | | | |
|---|---|---|---|---|
| 2,427,536 A | * | 9/1947 | Simons | B21D 1/12 72/386 |
| 4,303,224 A | * | 12/1981 | Nelson | B62D 17/00 254/131 |
| 5,292,149 A | | 3/1994 | Luger | |
| 7,111,849 B2 | | 9/2006 | Yun | |
| 7,845,666 B2 | | 12/2010 | Lynch et al. | |
| 7,914,020 B2 | | 3/2011 | Boston | |
| 9,187,126 B2 | | 11/2015 | Kwauchi et al. | |
| 2020/0223270 A1 | * | 7/2020 | Kunkel | B60G 3/26 |

FOREIGN PATENT DOCUMENTS

| | | | | |
|---|---|---|---|---|
| DE | 10251944 A1 | * | 5/2004 | ......... B60G 21/007 |
| EP | 1799472 B1 | | 5/2011 | |
| KR | 20030017668 A | | 3/2003 | |
| WO | WO-2005051712 A2 | * | 6/2005 | ......... B60G 17/0165 |

* cited by examiner

*Primary Examiner* — Paul N Dickson
*Assistant Examiner* — Scott F. Underwood
(74) *Attorney, Agent, or Firm* — Ray Copiellie; Bejin Bieneman PLC (57) ABSTRACT

An assembly includes a suspension link, an arm, an actuator, and a lock. The arm is connected to the suspension link. The arm includes a plurality of holes. The actuator is connected to the arm. The lock includes a pin releasably engageable with the plurality of holes of the arm.

20 Claims, 10 Drawing Sheets

VEHICLE SUSPENSION

BACKGROUND

Vehicles include components that are typically positioned for conventional driving along a roadway. For example, a tire can be aligned with the roadway such that a surface of the tire substantially evenly contacts the roadway. To adjust the components to operate the vehicle in a different manner, e.g., to adjust the alignment of the tire to improve handling during a turn, can be difficult, e.g., can require disassembly of one or more vehicle components.

DETAILED DESCRIPTION

An assembly includes a suspension link, an arm connected to the suspension link, the arm including a plurality of holes, an actuator connected to the arm, and a lock including a pin releasably engageable with the plurality of holes of the arm.

The assembly may further include a vehicle frame member, wherein the actuator may be pivotally connected to the vehicle frame member at a first pivot point, the arm may be pivotally connected to the vehicle frame member at a second pivot point, and the lock may be supported by the vehicle frame member.

The actuator may be pivotally connected to the arm at a third pivot point.

The suspension link may be movable from a first position to a second position, the actuator may be rotatable about the first pivot point when the suspension link moves from the first position to the second position, and the arm may be rotatable about the second pivot point when the suspension link moves from the first position to the second position.

The actuator may include a rod pivotally connected to the arm at a third pivot point, wherein the rod may be movable from a first rod position to a second rod position, the rod moving the arm to move the suspension link from the first position to the second position as the rod moves from the first rod position to the second rod position.

The plurality of holes may include a first hole and a second hole, wherein when the pin engages the first hole, the suspension link may be in a first position, and when the pin engages the second hole, the suspension link may be in a second position.

The second position may be outboard relative to the first position.

The first position may define a first suspension angle and the second position may define a second suspension angle.

The assembly may further include a vehicle wheel, wherein the suspension link may be connected to the vehicle wheel.

The suspension link may be movable from a first position defining a first camber angle of the vehicle wheel to a second position defining a second camber angle of the vehicle wheel.

The actuator may include a rod movable to a first rod position to move the suspension link to the first position and movable to a second rod position to move the suspension link to the second position.

The lock may include a solenoid actuator disposed on a first side of the arm and a block disposed on a second side of the arm, the block defining a cavity, and the solenoid actuator may be programmed to deploy the pin through one of the plurality of holes into the cavity of the block.

The solenoid actuator may be further programmed to retract the pin from the cavity of the block.

The assembly may further include a computer programmed to receive user input specifying an operation mode of a vehicle, the operation mode associated with a specified camber angle of a vehicle wheel, and to actuate the actuator to move the suspension link to provide the specified camber angle of the vehicle wheel.

The computer may be further programmed to actuate the lock to remove the pin from one of the holes of the arm and then to actuate the actuator to move the suspension link.

The computer may be further programmed to, upon providing the specified camber angle, actuate the lock to engage one of the holes of the arm.

The computer may be further programmed to move the suspension link from a first position defining a first camber angle of the vehicle wheel to a second position defining a second camber angle of the vehicle wheel.

The computer may be further programmed to move the arm from a first position corresponding to the first position of the suspension link to a second position corresponding to the second position of the suspension link.

The computer may be further programmed to actuate the actuator to move a rod pivotally connected to the arm to move the suspension link to provide the specified camber angle.

Changing the suspension angle of a wheel, such as a camber angle, a castor angle, or a toe angle, adjusts contact of a tire with a roadway, which can improve handling of a vehicle in a turn while increasing wear on the tire from uneven distribution of a surface of the tire on the roadway. Determining a camber angle for the wheel can require selection from competing design choices, weighing improved handling at the cost of increased wear on the tire. Manually changing the camber angle can be time-consuming and difficult, requiring disassembly of a wheel assembly and adjustment of a suspension link, or installation of additional components (e.g., adjustable suspension links) for each adjustment to the camber angle. The suspension links may be costly and difficult to install.

A user can provide input to a computer which actuates an actuator to move a rod pivotally connected to an arm, the arm connected to a suspension link. As the rod moves the arm, the arm moves the suspension link to provide a specified suspension angle. That is, the position of the rod corresponds to a specified suspension angle. The arm may be secured to a vehicle frame member to provide the specified suspension angle. When the computer determines to move the arm to a different suspension angle, the computer can actuate a lock to release the arm from the vehicle frame member, actuate the rod to move the arm, and actuate the lock to secure the arm to the vehicle frame member.

The user can provide input regarding an operation mode of the vehicle to the computer. The operation mode can include settings for vehicle components, e.g., traction control, stability control, throttle response, shock absorber damping, etc. Each operation mode adjusts the components for a particular type of driving, e.g., conventional roadway driving, racetrack driving, fuel-saving driving, etc. The computer can associate a camber angle with each operation mode based on the type of driving associated with the operation mode. Upon receiving the input for the operation mode, the computer can actuate the actuator to move the suspension link to provide the camber angle associated with the operation mode.

Figure 1:
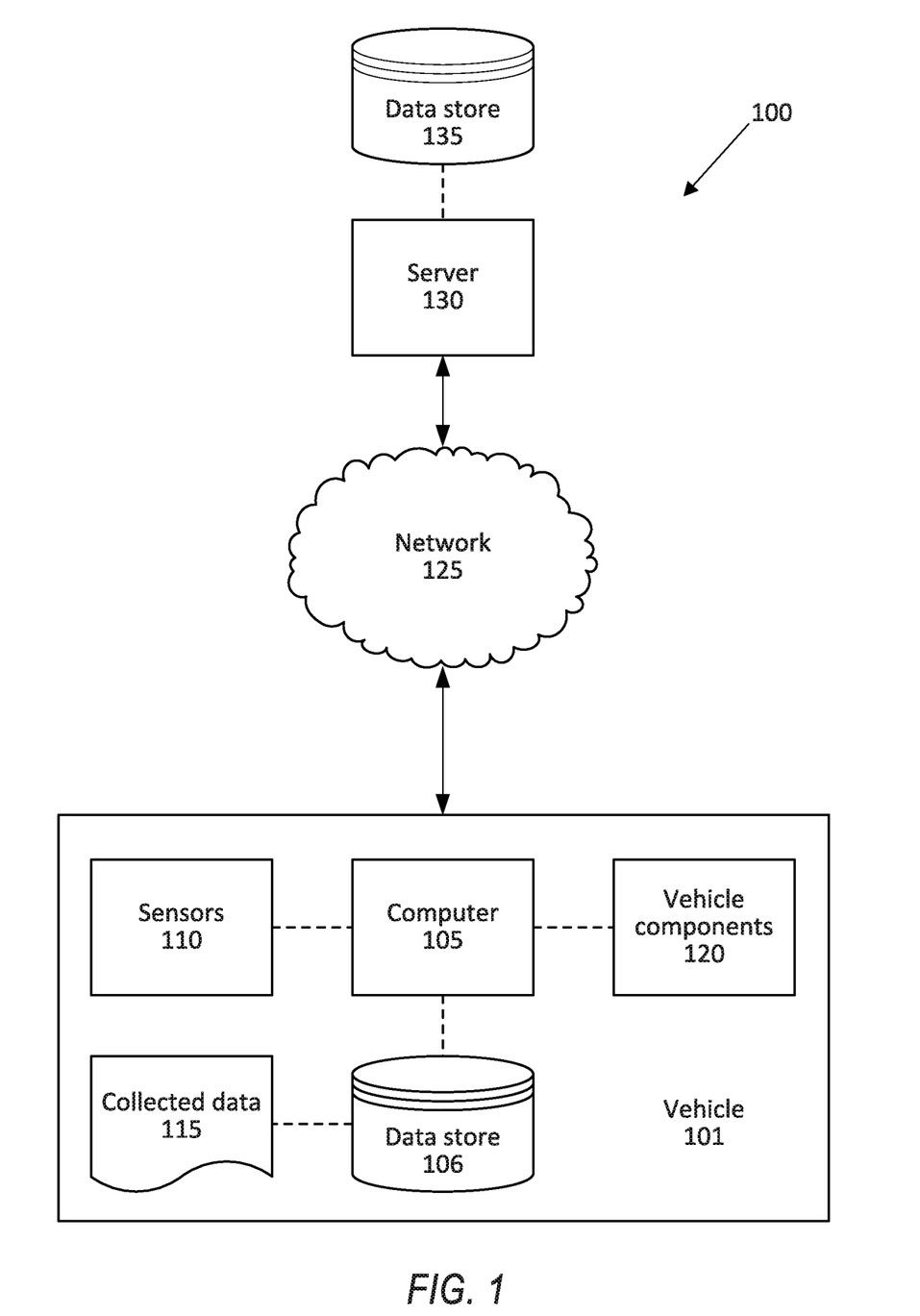
FIG. 1 is a block diagram of a system for adjusting a vehicle suspension.

FIG. 1 illustrates an example system 100 for adjusting a camber angle of a wheel in a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 includes multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 may include cameras, motion detectors, etc., i.e., sensors 110 to provide data 115 for evaluating a position of a component, evaluating a slope of a roadway, etc. The sensors 110 may, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can include a network 125 connected to a server 130 and a data store 135. The computer 105 can be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

With reference to the Figures, wherein like numerals indicate like parts throughout the several views, an assembly 200 in the vehicle 101 includes a suspension link 205, an arm 210, an actuator 215, and a lock 220. The arm 210 is connected to the suspension link 205. The arm includes a plurality of holes 225. The actuator 215 is connected to the arm 210. The lock 220 includes a pin 230 releasably engageable with the plurality of holes 225 of the arm 210.

The vehicle 101 includes a body 235. The body 235 may be of a unibody construction. In the unibody construction, the body 235 is unitary, i.e., a continuous one-piece unit, and includes a subframe. As another example not shown in the Figures, the body 235 and a frame may have a body-onframe construction (also referred to as a cab-on-frame construction). In other words, the body 235 and the frame are separate components, i.e., are modular, and the body 235 is supported on and affixed to the frame. Alternatively, the body 235 and the frame may have any suitable construction. The body and/or the frame may be formed of any suitable material, for example, steel, aluminum, etc. The vehicle 101 includes a frame member 240 that is part of the subframe (when the body is a unibody construction) or part of the frame (when the body is a body-on-frame construction). As described below, the assembly 200 is mounted to the frame member 240. Alternatively, the assembly 200 may be mounted to the body 235.

Figure 2A:
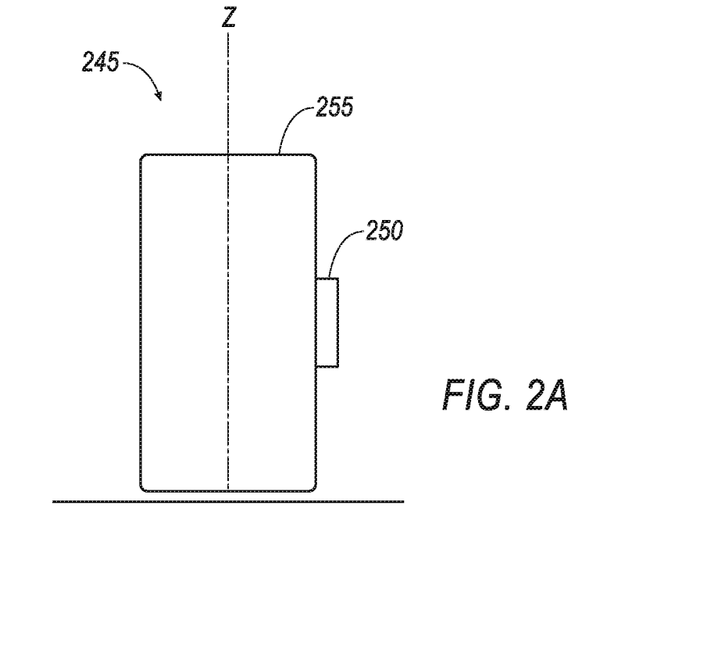
FIGS. 2A-2B are views of a wheel illustrating a camber angle.
Figure 2B:
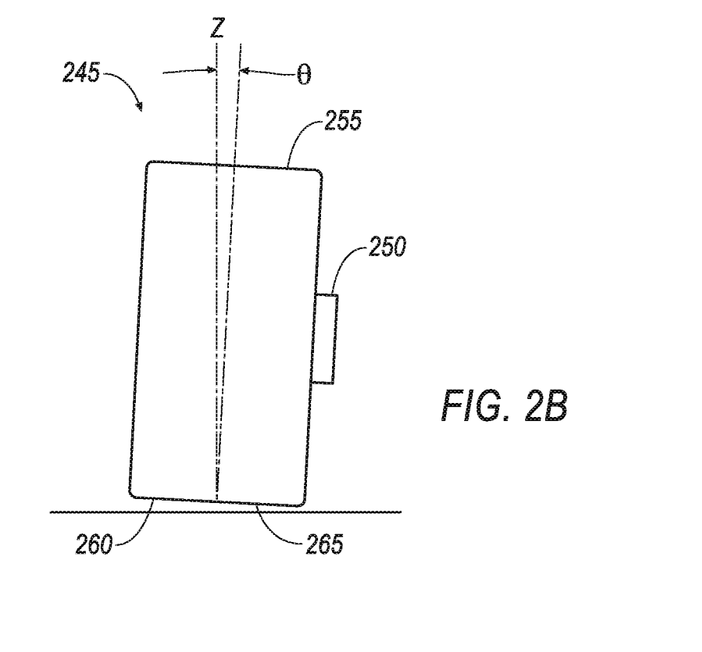
Figure 3:
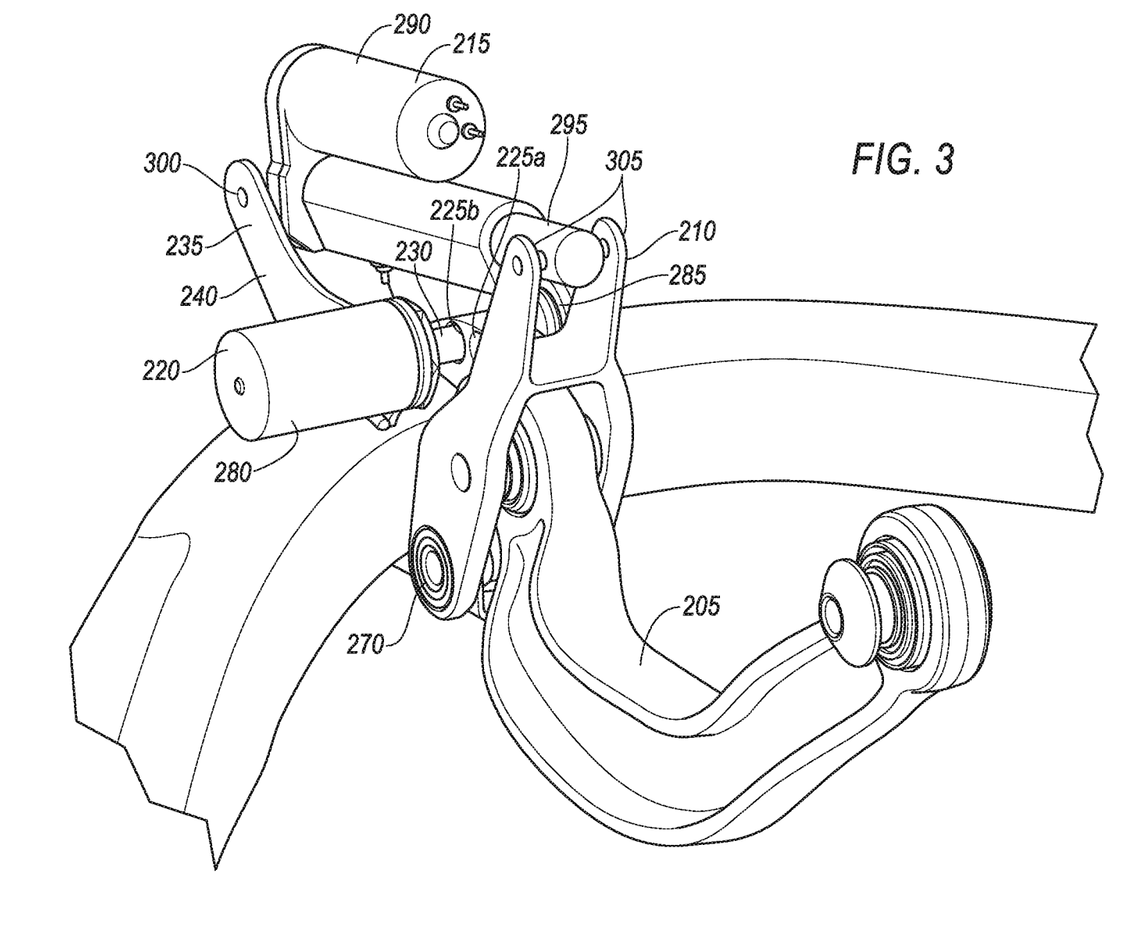
FIG. 3 is a perspective view of an assembly to adjust the camber angle.
Figure 4:
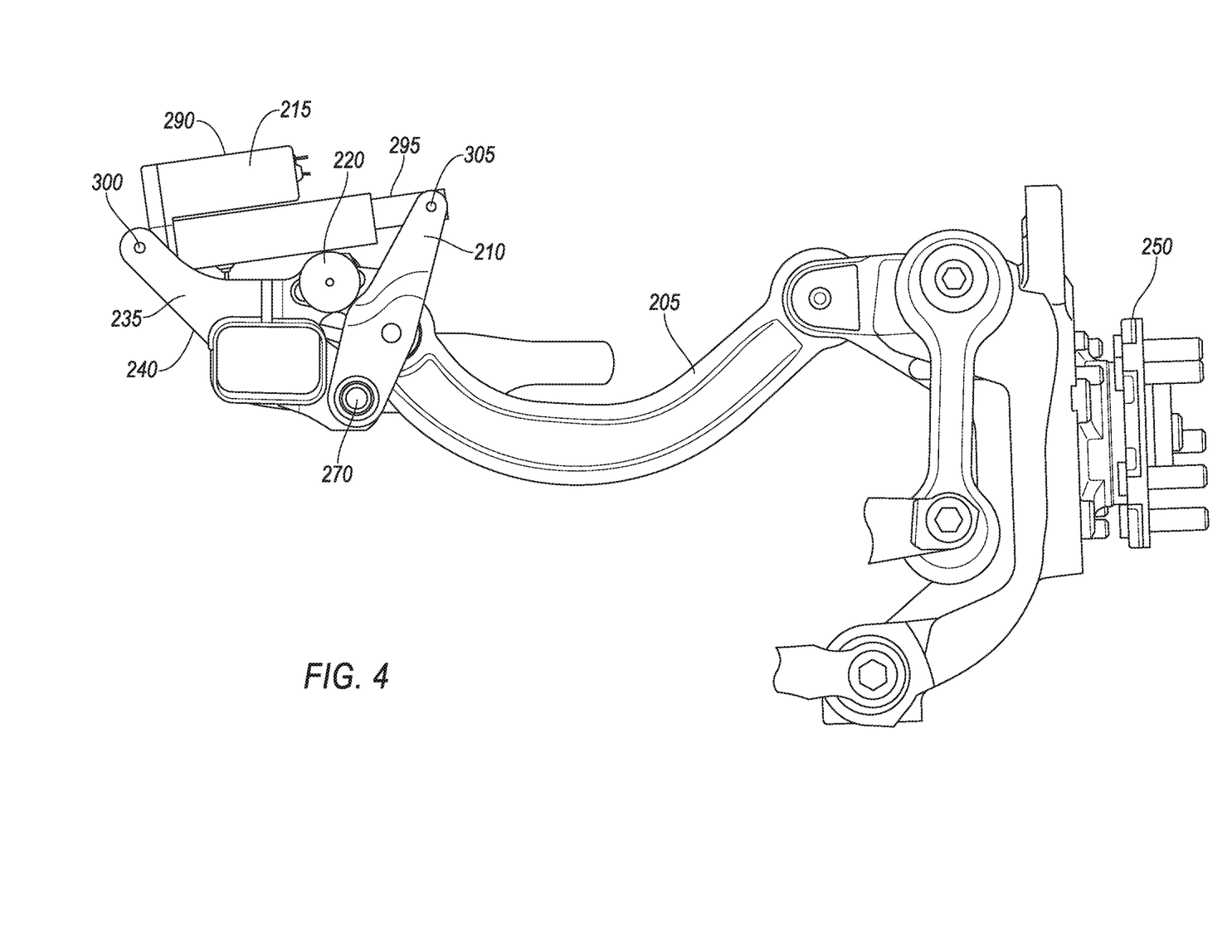
FIG. 4 is a side view of an assembly.

The assembly 200 includes a wheel 245, as shown in FIGS. 2A-2B. The wheel 245 includes a hub 250 and a tire 255. As shown in FIGS. 2A-2B, the wheel 245 defines a camber angle θ relative to a vertical axis Z. FIG. 2A shows a camber angle θ of substantially 0°, which may correspond to a "normal" operating mode, as described below. FIG. 2B shows a camber angle θ of substantially −2.5°, which can correspond to a "track" operating mode, as described below. When the camber angle θ directs the wheel 245 in an inboard direction of the vehicle 101, the camber angle θ is negative. When the camber angle θ directs the wheel 245 in an outboard direction of the vehicle 101, the camber angle θ is positive. When the camber angle θ is near zero, e.g., as shown in FIG. 2A, substantially all of an outer surface of the tire 255 contacts the roadway, evenly distributing contact along the outer surface. When the absolute value of the camber angle θ is greater than 0, e.g., as shown in FIG. 2B, portions of the tire 255 may have more contact with the roadway than other portions, which can improve operation of the vehicle 101 in a turn. For example, as shown in FIG. 2B, an outward portion 260 of the tire 255 may have decreased contact with the roadway and an inward portion 265 of the tire 255 may have increased contact with the roadway, improving turning of the vehicle 101.

The assembly 200 includes the suspension link 205, as shown in FIGS. 3-6C. The suspension link 205 is connected to the wheel. The suspension link 205 moves the wheel to a specified suspension angle, e.g., a camber angle θ. That is, the suspension link 205 is movable in an outboard direction, and the outboard movement of the suspension link 205, shown as a camber link 205 in FIGS. 3-6C, moves the hub 250 of the wheel 245, moving the wheel 245 to the camber angle θ. The camber link 205 is moveable from a first position to a second position. In the first position, the camber link defines a first camber angle θ of the wheel 245. In the second position, the camber link defines a second camber angle θ of the wheel 245. The second position may be outboard relative to the first position, and thus the second camber angle θ may be greater than the first camber angle θ.

As described above and used in the examples shown in the Figures, the suspension link 205 is shown as a camber link 205 that adjusts a camber angle θ of the wheel 245. Alternatively, not shown in the Figures, the suspension link 205 may be a castor link that adjusts a castor angle of the wheel 245, i.e., an angle between a suspension connected to the wheel 245 and a vertical axis having an origin at the center of the wheel 245. Yet alternatively, not shown in the Figures, the suspension link 205 may be a toe link that adjusts a toe angle of the wheel 245, i.e., an angle between the wheel 245 and a longitudinal axis of the vehicle 101. That is, the suspension angle may be one of a camber angle, a castor angle, or a toe angle.

Figure 5:
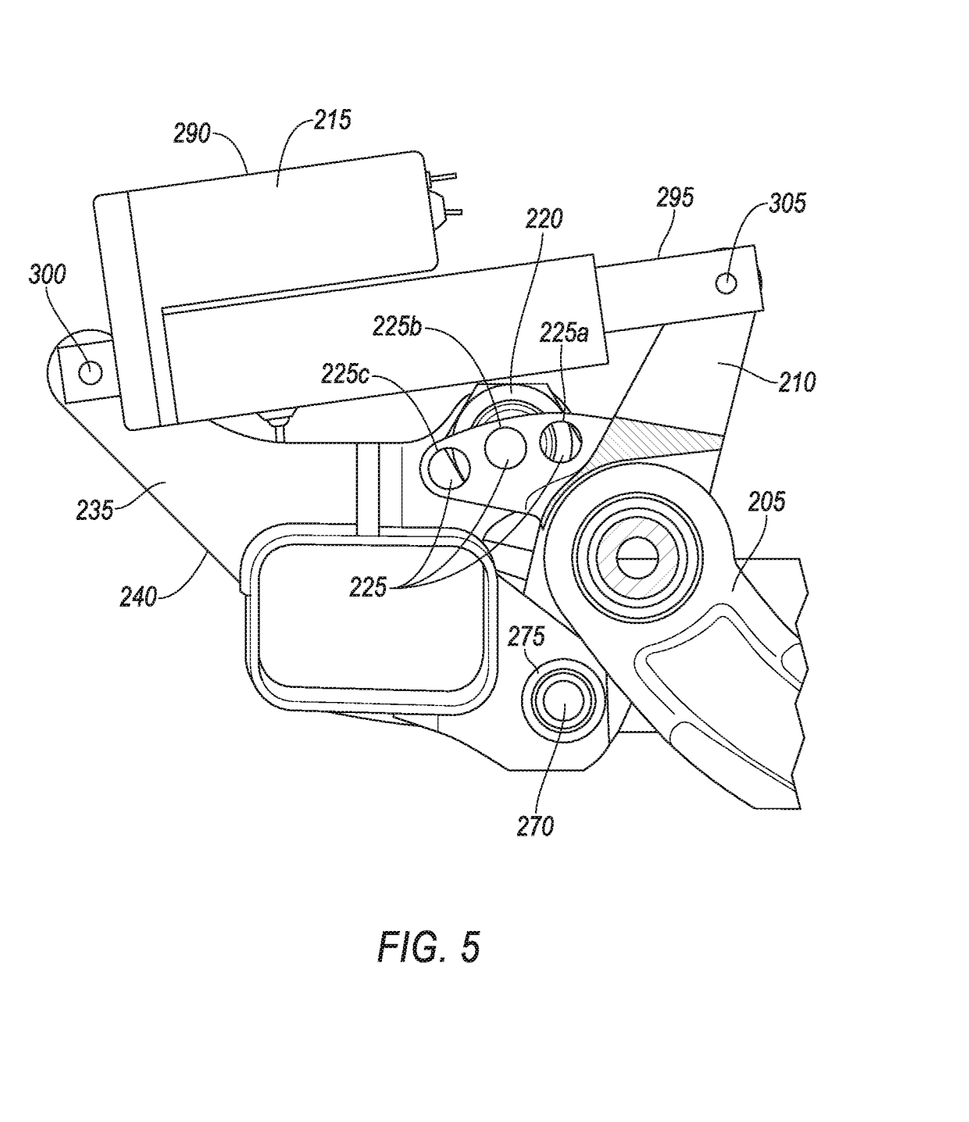
FIG. 5 is a magnified view of the assembly.
Figure 6A:
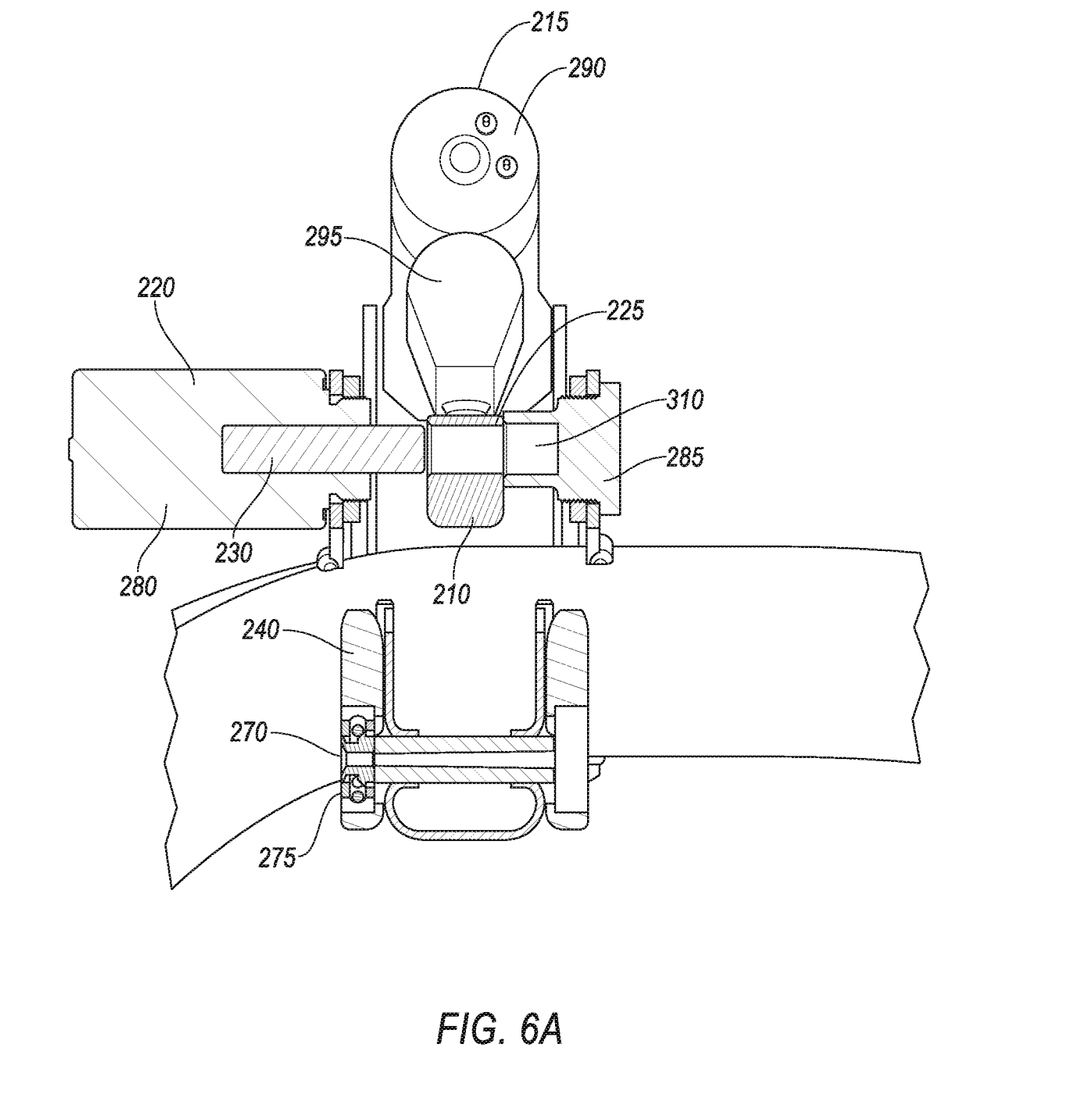
FIGS. 6A-6B are cross-sectional views of the assembly.
Figure 6B:
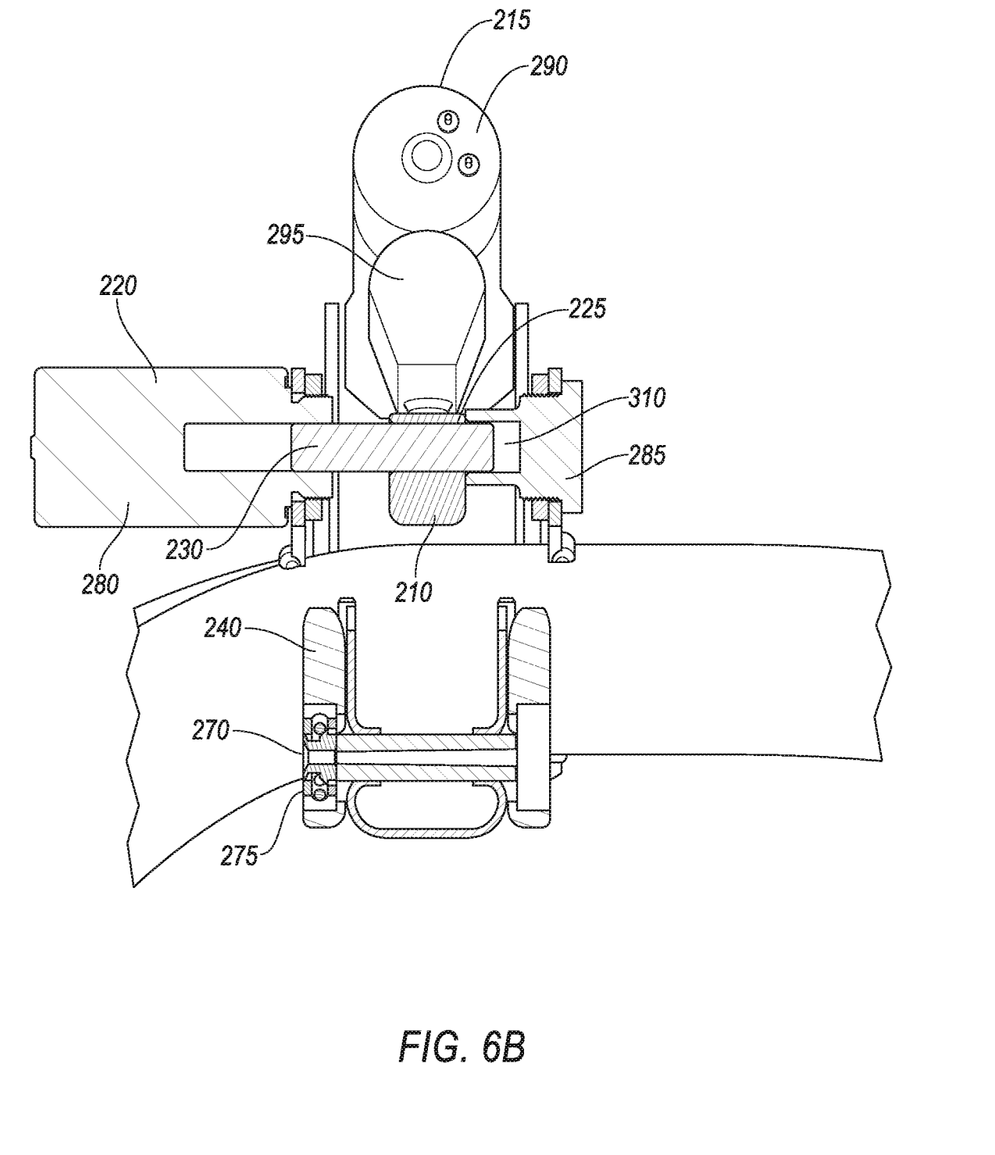
Figure 7A:
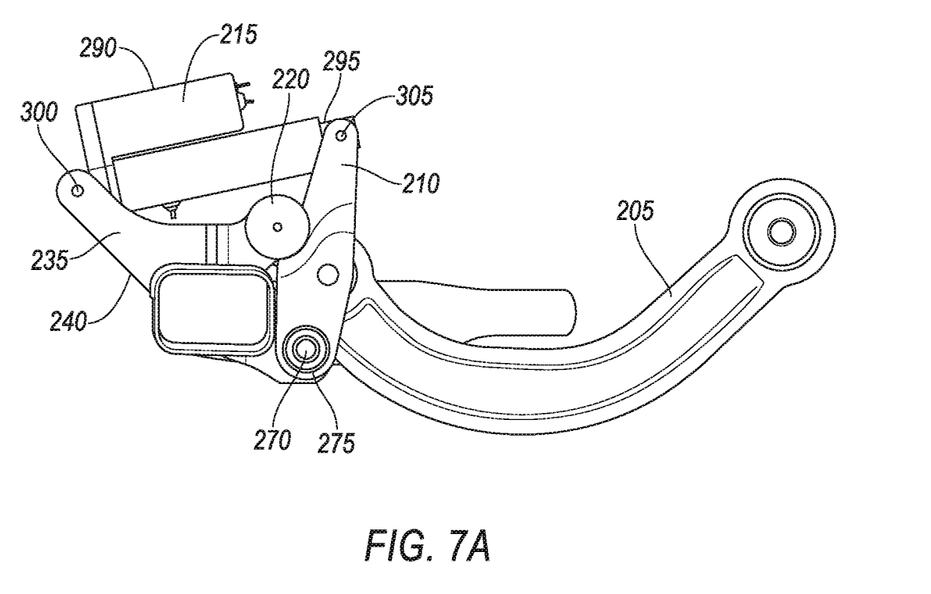
FIGS. 7A-7C are side views of the assembly in a plurality of positions.
Figure 7B:
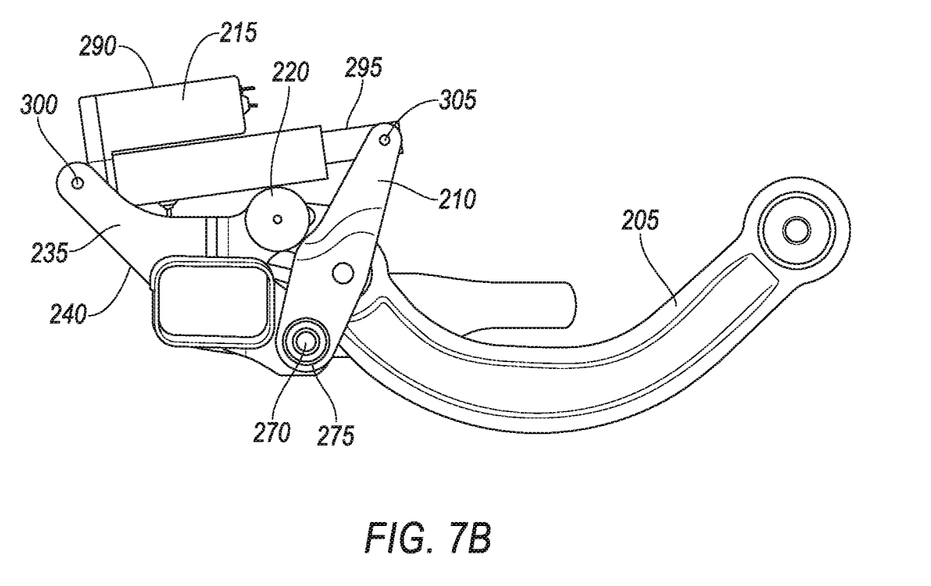
Figure 7C:
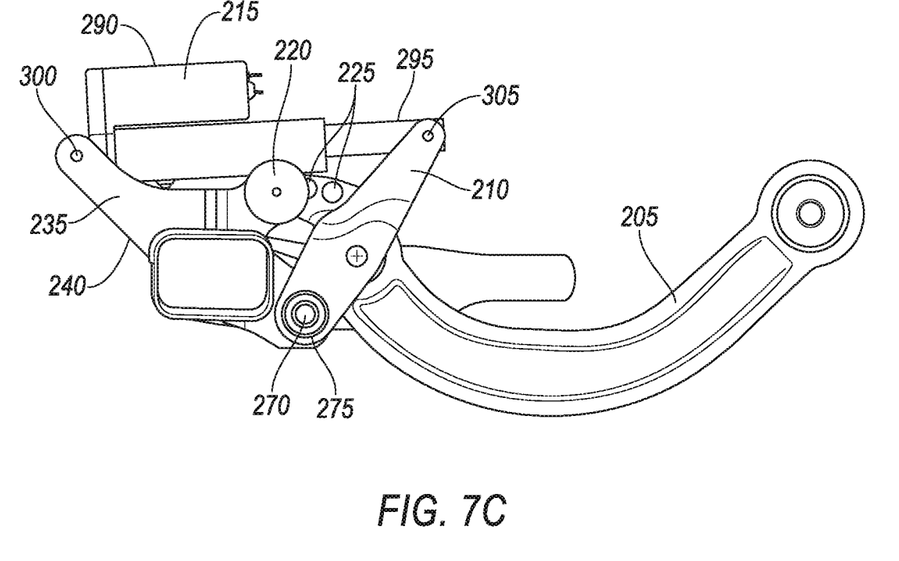

The assembly 200 includes the arm 210. The arm 210 is connected to the suspension link 205. The arm 210 is pivotally connected to the body 235 and/or the vehicle frame member 240. The arm 210 is movable from a first position to a second position, as shown in FIGS. 7A-7C. When the arm 210 is moved from the first position to the second position, the arm 210 moves the suspension link 205 from the first position to the second position, moving the wheel 245 from the first camber angle θ to the second camber angle θ. The arm 210 may be movable to a plurality of positions, e.g., to a third position as shown in FIGS. 7A-7C. The arm 210 defines a plurality of holes 225, each hole 225 corresponding to one of the positions, as described below, when the lock 220 engages the holes 225. FIGS. 5-6B show three holes 225a, 225b, 225c, collectively, holes 225. The arm 210 may have a suitable number of holes 225 corresponding to the positions to which the suspension link 205 may be moved, e.g., two, four, five, etc.

The arm 210 is pivotally connected to the vehicle frame member 240 at a pivot point 270, as shown in FIGS. 3-5, 7A-7C. That is, the arm 210 pivots about the pivot point 270 to move the suspension link 205 to a specific position. The arm 210 may be pivotally connected to the frame member 240 with a bearing 275 at the pivot point, e.g., a ball bearing, a roller bearing, or any other suitable device to allow rotation of the arm 210 relative to the vehicle frame member 240.

The assembly 200 includes the lock 220, as shown in FIGS. 3-7C. The lock 220 secures the arm 210 to a specific position, holding the suspension link 205 to provide a specific camber angle θ. The lock 220 is mounted to the body 235 and/or the frame member 240. The lock 220 includes a solenoid actuator 280, the pin 230, and a block 285, as shown in FIGS. 6A-6B. The block 285 defines a cavity 310. The solenoid actuator 280 moves the pin 230 through one of the holes 225 into the cavity 310 of the block 285, securing the arm 210 at the position corresponding to the hole 225. That is, when the pin 230 is secured in the block 285 and engages one of the holes 225, the pin 230 prevents movement of the arm 210, securing the arm 210 in one of the positions. Because each position of the arm 210 corresponds to a position of the suspension link 205 and a specific camber angle θ, each hole 225 corresponds to a specific camber angle θ. Thus, the computer 105 can move the arm 210 such that the hole 225 corresponding to the specified camber angle θ is aligned with the pin 230 and then actuate the solenoid actuator 280 to move the pin 230 through the hole 225 and into the cavity 310 of the block 285, securing the suspension link 205 to provide the specified camber angle θ. When the computer 105 determines to move the wheel 245 to a different camber angle θ, the computer 105 can actuate the solenoid actuator 280 to retract the pin 230 from the cavity 310 of the block 285 and the hole 225, move the arm 210 to align a different hole 225 corresponding to the specified camber angle θ, and then actuate the solenoid actuator 280 to move the pin 230 through the hole 225 and into the block 285. For example, the computer 105 can actuate the solenoid actuator 280 to retract the pin 230 from the cavity 310 of the block 285 and the hole 225a, corresponding to the position shown in FIG. 7A, move the arm 210 to align the hole 225b with the pin 230, and then actuate the solenoid actuator 280 to extend the pin 230 into the cavity 310 of the block 285 through the hole 225b, corresponding to the position shown in FIG. 7B.

The assembly 200 includes the actuator 215, as shown in FIGS. 3-7C. In the examples shown in the Figures, the actuator 215 is a linear actuator 215, i.e., a device that translates linearly. The actuator 215 can be, e.g., electrically powered with a motor, hydraulically powered, pneumatically powered. Alternatively, the actuator 215 can include, e.g., gears, worm gears, cams, etc. The linear actuator 215 includes a motor 290 and a rod 295. The rod 295 telescopically extends away from the motor. That is, the computer 105 can actuate the motor 290 to extend the rod 295 from a first rod position to a second rod position, e.g., from the position shown in FIG. 7A to the position shown in FIG. 7B. The rod 295 is pivotally connected to the arm 210. As the rod 295 moves from the first rod position to the second rod position, the rod 295 moves the arm 210 from the first position to the second position. The computer 105 may actuate the linear actuator 215 to move the arm 210 to align one of the holes 225 with the pin 230, moving the suspension link 205 to provide the specified camber angle θ. That is, the first rod position may align a first hole 225a with the lock 220, the second rod position may align a second hole 225b with the lock 220, and a third rod position may move align a third hole 225c with the lock 220, as shown in FIGS. 7A-7C.

The linear actuator 215 is pivotally connected to the vehicle frame member 240 at a pivot point 300, as shown in FIGS. 3-5, 7A-7C. Alternatively, not shown in the Figures, the linear actuator 215 may be pivotally connected to the body 235. The linear actuator 215 pivots about the pivot point 300 as the rod 295 moves the arm 210. That is, as the rod 295 extends to move the arm 210, the linear actuator 215 and the arm 210 move at their respective pivot points 270, 300 relative to the vehicle frame member 240 to move the arm 210 to the specified position. The linear actuator 215 may be pivotally connected to the frame member 240 with a bearing (not shown) at the pivot point 300, e.g., a ball bearing, a roller bearing, or any other suitable device to allow rotation of the linear actuator 215 relative to the vehicle frame member 240.

The rod 295 is pivotally connected to the arm 210 at a pivot point 305, as shown in FIGS. 3-5, 7A-7C. That is, the rod 295 moves about the pivot point 305 as the rod 295 extends away from the motor 290. The rod 295 may be pivotally connected to the arm 210 with a bearing (not shown) at the pivot point 305, e.g., a ball bearing, a roller bearing, or any other suitable device to allow rotation of the rod 295 relative to the arm 210. Thus, when the computer 105 actuates the motor 290 to extend the rod 295 from the motor 290, the motor 290, the rod 295, and the arm 210 rotate about their respective pivot points 270, 300, 305 to move the arm 210 to the specified position.

The computer 105 includes an operation mode stored in the data store 106. The "operation mode" is a predetermined list of settings for vehicle components 120 associated with specific types of operation of the vehicle 101. For example, the computer 105 can include a "normal" operation mode in which the settings for the vehicle components 120 are determined for conventional operation of the vehicle 101 on a roadway. In another example, the computer 105 can include a "track" operation mode in which the settings for the vehicle components 120 are determined for use on a race track. In another example, the computer 105 can include a "tow" operation mode in which the settings for the vehicle components are determined for use when towing cargo. In another example, the computer 105 can include an "eco" operation mode in which the settings for the vehicle components are determined to reduce fuel consumption.

The computer 105 receives user input specifying the operation mode. The user can provide input to a human-machine interface (HMI) (not shown), e.g., a touchscreen, a button, a lever, a rotating dial, etc. Upon receiving the user input, the computer 105 can actuate components 120 to settings associated with the operation mode, e.g., a camber angle θ, a shock absorber stiffness, a steering assist stiffness, etc.

The operation mode can be associated with a specified camber angle θ. As described above, the camber angle θ can adjust contact of the tire 255 with the roadway, affecting turning of the vehicle 101. In a "track" operation mode, the computer 105 can adjust the camber angle θ to a specified value to improve handling of the vehicle 101 turning around a corner, e.g., −1.75°, −2.5°, −3.1°, etc. In a "normal" operation mode, the computer 105 can adjust the camber angle θ to a lower value, e.g., 0°, −1°, etc., than the camber angle θ associated with the "track" operation mode to reduce wear on the tire 255.

When the user provides input for a specific operation mode, the computer 105 can move the wheel 245 to the camber angle θ associated with the operation mode. The computer 105 can actuate the lock 220 to retract the pin 30 from the block 285 and the hole 225 of the arm 210. The computer 105 can actuate the motor 290 of the linear actuator 215 to move the rod 295 to the specified rod position corresponding to the camber angle θ associated with the operation mode. When the motor 290 moves the rod 295 to the specified rod position, the computer 105 can actuate the solenoid actuator 280 to move the pin 230 through the hole 225 of the arm 210 and into the block 285, securing the arm 210 in the position corresponding to the camber angle θ.

The computer 105 can refer to a lookup table or the like stored in the data store 106 and/or the server 130 to determine the rod position corresponding to the camber angle θ for the specified operation mode:

| Rod Position (millimeters) | Camber Angle θ (degrees) |
|---|---|
| 0 | −1.00 |
| 25 | −1.75 |
| 50 | −2.50 |

That is, the computer 105 can determine the length of the rod 295 with, e.g., a sensor 110, and upon reaching the length corresponding to the specific rod position, the computer 105 can stop the motor 290 and actuate the solenoid actuator 280 to extend the pin 230 through the hole 225 and into the cavity 310 of the block 285, securing the suspension link 205 to provide the specified camber angle θ. Alternatively, the computer 105 may actuate the linear actuator 215 until the computer 105 detects that the arm 210 is in the specified position. The computer 105 may determine the position of the arm 210 with a suitable device, e.g., a rotation sensor 110 at one of the pivot points 270, 300, 305 with a corresponding lookup table or the like, a linear sensor 110 on at least one of the arm 210, the rod 295, and/or the suspension link 205, a DC-encoded motor 290 of the linear actuator 215, an acceleration sensor 110 on at least one of the arm 210, the rod 295, and/or the suspension link 205, etc.

Figure 8:
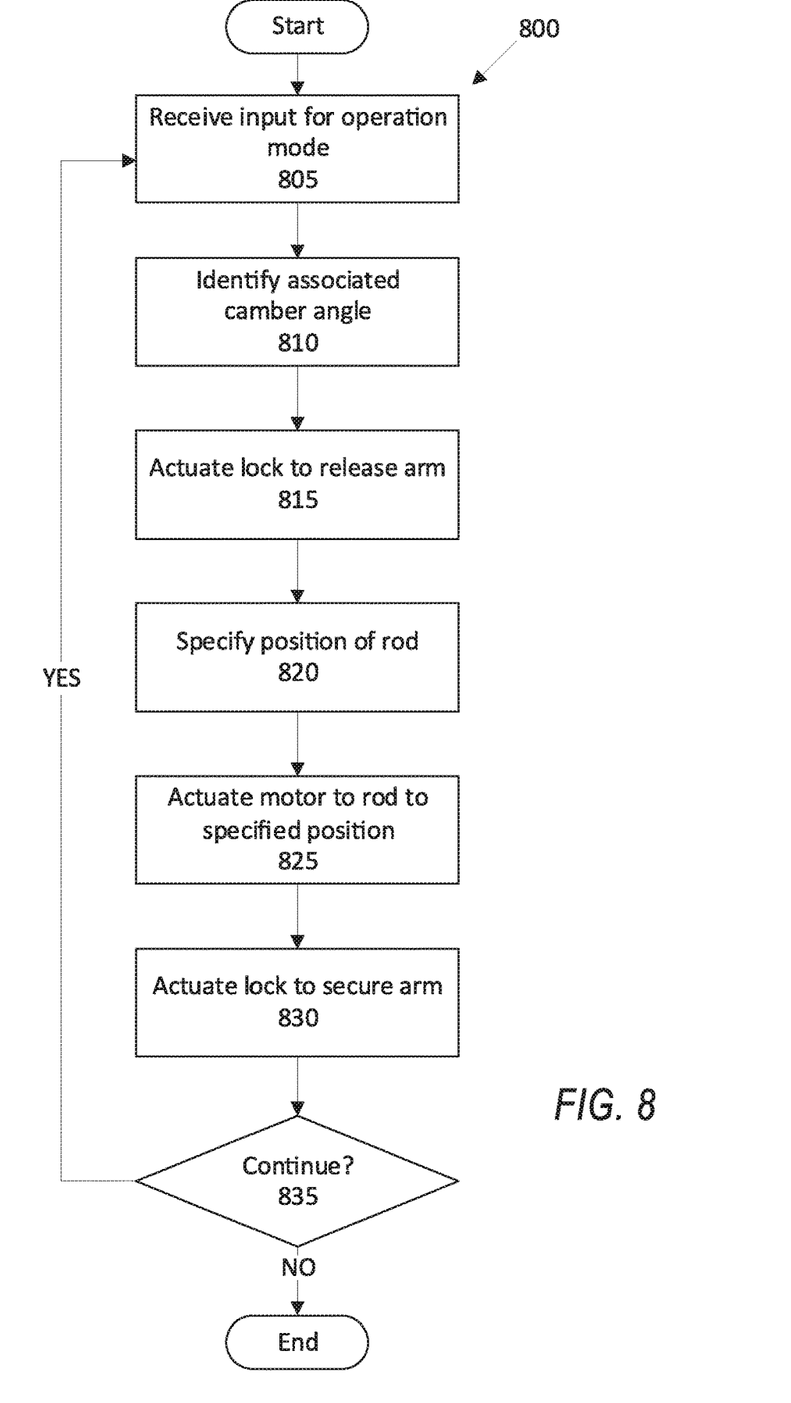
FIG. 8 is a block diagram of an example process for adjusting the vehicle suspension.

FIG. 8 is a block diagram of an example process 800 for providing a suspension angle θ of a wheel 245. The process 800 begins in a block 805, in which the computer 105 receives input for an operation mode of the vehicle 101. As described above, the operation mode is a predetermined list of settings for vehicle components 120 associated with specific types of operation of the vehicle 101, e.g., a specified camber angle θ, a specified suspension stiffness, a specified steering assist stiffness, etc. As described above, the user can provide input to a HMI, e.g., a touchscreen, a button, a lever, etc. The input specifies one of a plurality of operation modes, e.g., a "normal" operation mode, a "track" operation mode, a "tow" operation mode, etc.

Next, in a block 810, the computer 105 identifies the camber angle θ associated with the operation mode. The camber angle θ can be a predetermined value stored in the data store 106 associated with the operation mode. As described above, the camber angle θ can affect handling of the vehicle 101, and the operation mode can be associated with a specified camber angle θ to provide handling associated with the operation mode.

Next, in a block 815, the computer 105 actuates a lock 220 to release an arm 210. The computer 105 can actuate a solenoid actuator 280 to retract a pin 230 from a cavity 310 of a block 285 and a hole 225 of the arm 210. By removing the pin 230 from the hole 225, the solenoid actuator 280 releases the arm 210.

Next, in a block 820, the computer 105 specifies a rod position of a rod 295 of a linear actuator 215. As described above, each rod position corresponds to a specific camber angle θ, and the computer 105 can specify the rod position associated with the camber angle θ specified in the operation mode. That is, the computer 105 can specify a length to which the rod 295 extends to move the suspension link 205 to provide the camber angle θ.

Next, in a block 825, the computer 105 actuates a motor 290 of the linear actuator 215 to move the rod 295 to the specified rod position. As the rod 295 moves to the rod position, the arm 210 moves to a specified position that moves a suspension link 205. When the rod 295 is in the specified rod position, the arm 210 is positioned such that the suspension link 205 provides the specified camber angle θ.

Next, in a block 830, the computer 105 actuates the solenoid actuator 280 to move the pin 230 through a different hole 225 of the arm 210 and into the cavity 310 of the block 285. As described above, the arm 210 includes a plurality of holes 225, each hole 225 associated with a different position of the arm 210 to move the suspension link 205 to provide a different camber angle θ. When the pin 230 is disposed in the cavity 310 of the block 285 through the hole 225, the pin 230 prevents movement of the arm 210, securing the suspension link 205 to provide the specified camber angle θ.

Next, in a block 835, the computer 105 determines whether to continue the process 800. For example, the computer 105 can determine not to continue the process 800 when the vehicle 101 is stopped and powered off. If the computer 105 determines to continue, the process 800 returns to the block 805 to receive additional user input. Otherwise, the process 800 ends.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. For example, in the process 800, one or more of the steps may be omitted, or the steps may be executed in a different order than shown in FIG. 8. In other words, the descriptions of systems and/or processes herein are provided for the purpose of illustrating certain embodiments, and should in no way be construed so as to limit the disclosed subject matter.

The phrase "based on" encompasses being partly or entirely based on. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a suspension link;
   an arm connected to the suspension link, the arm including a plurality of holes including a first hole and a second hole;
   an actuator connected to the arm;
   a lock including a pin releasably engageable with the plurality of holes of the arm; and
   when the pin engages the first hole, the suspension link is in a first position, and when the pin engages the second hole, the suspension link is in a second position.

2. The assembly of claim 1, further comprising a vehicle frame member, wherein the actuator is pivotally connected to the vehicle frame member at a first pivot point, the arm is pivotally connected to the vehicle frame member at a second pivot point, and the lock is supported by the vehicle frame member.

3. The assembly of claim 2, wherein the actuator is pivotally connected to the arm at a third pivot point.

4. The assembly of claim 2, wherein the suspension link is movable from the first position to the second position, the actuator is rotatable about the first pivot point when the suspension link moves from the first position to the second position, and the arm is rotatable about the second pivot point when the suspension link moves from the first position to the second position.

5. The assembly of claim 4, wherein the actuator includes a rod pivotally connected to the arm at a third pivot point, wherein the rod is movable from a first rod position to a second rod position, the rod moving the arm to move the suspension link from the first position to the second position as the rod moves from the first rod position to the second rod position.

6. The assembly of claim 1, wherein the second position is outboard relative to the first position.

7. The assembly of claim 1, wherein the first position defines a first suspension angle and the second position defines a second suspension angle.

8. The assembly of claim 1, further comprising a vehicle wheel, wherein the suspension link is connected to the vehicle wheel.

9. The assembly of claim 8, wherein the suspension link is movable from a first position defining a first camber angle of the vehicle wheel to a second position defining a second camber angle of the vehicle wheel.

10. The assembly of claim 9, wherein the actuator includes a rod movable to a first rod position to move the suspension link to the first position and movable to a second rod position to move the suspension link to the second position.

11. The assembly of claim 1, wherein the lock includes a solenoid actuator disposed on a first side of the arm and a block disposed on a second side of the arm, the block defining a cavity, and the solenoid actuator is programmed to deploy the pin through one of the plurality of holes into the cavity of the block.

12. The assembly of claim 11, wherein the solenoid actuator is further programmed to retract the pin from the cavity of the block.

13. The assembly of claim 1, further comprising a computer programmed to receive user input specifying an operation mode of a vehicle, the operation mode associated with a specified camber angle of a vehicle wheel, and to actuate the actuator to move the suspension link to provide the specified camber angle of the vehicle wheel.

14. The assembly of claim 13, wherein the computer is further programmed to actuate the lock to remove the pin from one of the holes of the arm and then to actuate the actuator to move the suspension link.

15. The assembly of claim 14, wherein the computer is further programmed to, upon providing the specified camber angle, actuate the lock to engage one of the holes of the arm.

16. The assembly of claim 13, wherein the computer is further programmed to move the suspension link from a first position defining a first camber angle of the vehicle wheel to a second position defining a second camber angle of the vehicle wheel.

17. The assembly of claim 16, wherein the computer is further programmed to move the arm from a first position corresponding to the first position of the suspension link to a second position corresponding to the second position of the suspension link.

18. The assembly of claim 13, wherein the computer is further programmed to actuate the actuator to move a rod pivotally connected to the arm to move the suspension link to provide the specified camber angle.

19. An assembly, comprising:
a suspension link;
an arm connected to the suspension link, the arm including a plurality of holes;
an actuator connected to the arm;
a lock including a pin releasably engageable with the plurality of holes of the arm; and
a vehicle frame member;
wherein the actuator is pivotally connected to the vehicle frame member at a first pivot point, the arm is pivotally connected to the vehicle frame member at a second pivot point, and the lock is supported by the vehicle frame member.

20. An assembly, comprising:
a suspension link;
an arm connected to the suspension link, the arm including a plurality of holes;
an actuator connected to the arm;
a lock including a pin releasably engageable with the plurality of holes of the arm; and
a computer programmed to receive user input specifying an operation mode of a vehicle, the operation mode associated with a specified camber angle of a vehicle wheel, and to actuate the actuator to move the suspension link to provide the specified camber angle of the vehicle wheel.

* * * * *